(12) United States Patent
Berndt et al.

(10) Patent No.: US 6,366,448 B1
(45) Date of Patent: *Apr. 2, 2002

(54) HIGH-VOLTAGE SUPPLY INCLUDING FIRST AND SECOND SEGMENTS RESPECTIVELY INCLUDING ONLY LOW VOLTAGE COMPONENTS AND LOW AND HIGH-VOLTAGE COMPONENTS

(75) Inventors: Manfred Berndt, Karlsbao; Volker Brombacher, Pfinztal, both of (DE)

(73) Assignee: Agilent Technologies, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/598,891

(22) Filed: Jun. 22, 2000

(30) Foreign Application Priority Data

Jun. 22, 1999 (DE) .......................... 199 28 400

(51) Int. Cl.[7] ................................. H02B 1/04
(52) U.S. Cl. ..................... 361/601; 200/50.21
(58) Field of Search ................. 361/600, 601, 361/605, 615, 616, 724, 725, 752, 728–730, 622–625; 200/50.12, 50.13, 50.17, 50.21

(56) References Cited

U.S. PATENT DOCUMENTS

| | | | |
|---|---|---|---|
| 3,655,926 A | | 4/1972 | Meermans |
| 4,249,227 A | * | 2/1981 | Kato et al. ............... 361/622 |
| 4,677,524 A | * | 6/1987 | Shiraishi et al. ......... 361/605 |
| 4,742,428 A | * | 5/1988 | Conrad .................... 361/606 |
| 4,785,376 A | * | 11/1988 | Dively ..................... 361/622 |
| 5,424,911 A | * | 6/1995 | Joyner et al. ............ 361/616 |
| 5,757,260 A | * | 5/1998 | Smith et al. ............. 337/186 |

FOREIGN PATENT DOCUMENTS

| | | |
|---|---|---|
| DE | 3914928 A1 | 11/1989 |
| DE | 9211617.5 | 12/1992 |
| EP | 0310589 A2 | 6/1988 |
| EP | 0844813 A2 | 11/1997 |

* cited by examiner

*Primary Examiner*—Gerald Tolin

(57) ABSTRACT

The disclosed HV supply device has a first housing part (1) that serves as an outside cover. In addition, a second housing part (6) forming two sides is provided. On the first side is the high-voltage supply part (8), and on the second side is the low-voltage supply part (9) which is physically or spatially separated from the high-voltage supply part (8). The first side of the second housing part (6) has a first mounting rack (14) to receive electrical or electronic low-voltage (16) and high-voltage components (17), and the second side has a second mounting rack (13) to receive electrical or electronic low-voltage components (15), whereby the two mounting racks (13, 14) are connected by an electrical connecting line (11, 12) penetrating the second housing part (6). The second (6) and the first housing part (1) are designed so that the high-voltage supply part (8) is enclosed on all sides in an area within one of the two housing parts after the two housing parts (1, 6) are joined. The suggested spatial separation of the LV from the HV substantially increases and improves the operational safety when handling such a HV supply device. In addition, it allows easy and safe access to the low-voltage electrical equipment or electronics without having to turn off the high-voltage while minimising the danger of contacting it.

20 Claims, 3 Drawing Sheets

HIGH-VOLTAGE SUPPLY INCLUDING FIRST AND SECOND SEGMENTS RESPECTIVELY INCLUDING ONLY LOW VOLTAGE COMPONENTS AND LOW AND HIGH-VOLTAGE COMPONENTS

FIELD OF THE INVENTION

The invention concerns an electrical high-voltage supply device with a high-voltage supply part and a low-voltage supply part, whereby a low-voltage at the low-voltage supply part is upwardly transformable into a high-voltage at the high-voltage supply part, and whereby the high-voltage-supply part and the low-voltage supply part can be at least partially covered from the outside or enclosed by a housing part.

BACKGROUND OF THE ART

High voltage power supplies have very stringent requirements for operating safely, especially in regard to high-voltage (HV). One must at least ensure that both the user operating such an HV system and the service professional working on it (usually an HV electrician or an HV electrotechnician) cannot contact any HV components. In regard to the voltage sources considered here, the basic voltage range assignable to HV starts at the dangerous-to-contact voltage of approximately 60 V (defined as falling within the range of HV in the following), and basically any voltage above that. The value of 60 V represents a voltage that can be enough to overcome average human skin resistance and therefore permit current surges that are deadly to humans.

U.S. Pat. No. 3,655,926, for example, discloses a prior-art switchgear cabinet for an HV supply having a safety mechanism that inactivates the HV as soon as an access door to the switchgear cabinet is opened. Correspondingly, the HV is released as soon as the door is closed. In addition, the HV source can be manually changed to live even though the door is open, for example to service the HV source. This exception is automatically terminated when the door is reclosed.

In addition, there are prior-art HV supplies where the low-voltage (LV) and high-voltage part (HV part) are in the same housing, and the LV part and the HV part are freely accessible after opening the housing. If the LV part of the device needs to be serviced, there is always the danger that the HV parts will be contacted manually or otherwise.

The present invention is hence based on the problem of creating a HV supply device of the cited kind that avoids the cited disadvantages of prior-art devices and allows easy and safe access to low-voltage electrical equipment or electronics without however having to shut off the high-voltage while simultaneously minimising the danger of contact. In addition, it is desirable for the entire power supply to be as modular as possible so that, for example, the individual components or even all the electrical equipment or electronics can be placed in a housing containing other components.

SUMMARY OF THE INVENTION

In particular, the cited problems are solved by an HV supply device or a housing arrangement of the initially-described kind suitable for such a supply device by providing a second housing part forming two sides. The high-voltage supply part is on the first side, and the low-voltage supply part on the second side spatially and/or physically separate from the high-voltage supply part. The second and the first housing parts can be joined in such a manner that the high-voltage supply part is in an area enclosed on all sides by one of the two housing parts after they are joined. The suggested spatial separation of the LV and HV substantially increases and improves operational safety when working with such an HV supply device. In addition, it allows easy and safe access to the low-voltage electrical equipment or electronics without having to turn off the high-voltage, and hence minimizes the danger of contacting the high voltage.

In a preferred embodiment of the invention, the first side of the second housing part has a first mounting rack to receive electrical or electronic low-voltage and high-voltage components, and the second side has a second mounting rack to receive electrical or electronic low-voltage components in the HV supply device according to the invention. The two mounting racks are connected by an electrical connecting line that penetrates or bridges the housing part. Arranging the LV and HV on spatially separate mounting racks (e.g., essentially flat mounting plates) and electrically connecting them with only a single line strictly separates the LV and HV and enhances desired operational safety. It can also be advantageous for the second housing part to have an electrical penetration through which the connecting line is guided between the mounting racks. An electrical bridge between the two mounting racks can also be created by a ribbon cable, a plug connection, a flexible printed circuit board, or a wireless transmission path.

To also offer maximum safety on the high-voltage side of the second housing part (especially against sparkover or creepage current), the electrical or electronic components on the first side of the second housing part can proceed from the electrical penetration along the voltage gradient from low-voltage to high-voltage. This measure minimizes the danger of HV sparkover and simultaneously ensures a highly compact construction due to the relatively small dimensions of the HV mounting rack and hence of the entire device. In a particularly advantageous embodiment, the electrical penetration can be essentially in the centre in reference to the mounting rack, and the electrical or electronic modules on the side of the high-voltage supply part proceed outward from the penetration in an essentially radial manner corresponding to a voltage gradient of low-voltage to high-voltage.

To further increase safety against contacting HV parts, the first and the second housing parts can be joined in a positive fit so that the high-voltage area is inaccessible after both housing parts are brought together.

To make it particularly easy and simple to exchange the individual components or even the entire power supply (to the extent that it is a part of a larger housing that includes other components), the second housing part can be designed as a withdrawable module with the high-voltage and low-voltage supply part.

To make it easier to access the LV despite the cited safety requirements for the HV, the withdrawable module can be open on least one side, and the first housing part can have a wall element that essentially formes a positive fit with the housing of the withdrawable module. Another advantage of the embodiment of the withdrawable module is that the HV is also very easily accessible from the outside after the withdrawable module has been removed from the housing part, and this makes the HV easy to service.

To further increase operational safety, a switch can be provided that interrupts the high-voltage when the withdrawable module is removed from the first housing part. Such a switch offers the greatest possible safety in dealing with the HV since the interaction of the switch with the housing arrangement completely prevents a person from coming into contact with active or live HV components.

Other tasks, advantages and features of the device according to the invention are found in the following description of an exemplary embodiment.

DETAILED DESCRIPTION OF THE DRAWINGS

Figure 1:
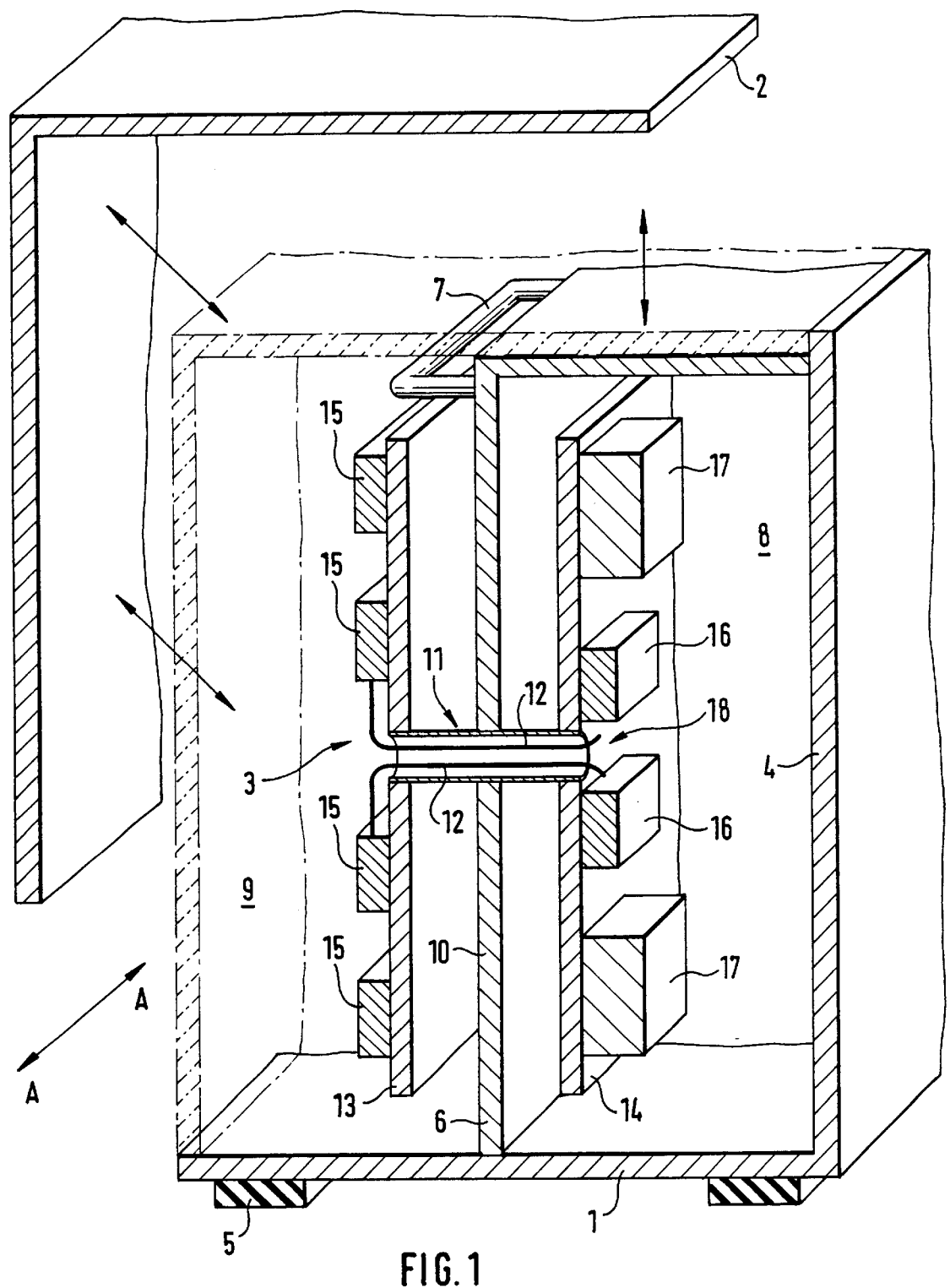
FIG. 1, a side section of a housing arrangement with an HV supply device according to the invention.

FIG. 1 is a side view of an exemplary embodiment of an electrical HV supply device 3 according to the invention in a housing 1, 2. The figure corresponds to a section perpendicular to the lengthwise axis 'A—A' of the housing 1, 2. The housing 1, 2 has a first housing part 1, that primarily supports the assemblies in the housing, and simultaneously serves to externally cover or screen these assemblies. The first housing part 1 has a cover 2 that is releasably connected to the fixed part of this housing part. The first housing part 1 has in particular a rear wall 4 on the HV side. The function of this rear wall 4 will be explained in greater detail in the following. In addition, this housing part 1 has rubber feet 5 on the bottom that secure the entire housing 1, 2 and keep it from slipping on a flat surface. In particular, one can see in the figure that the housing 1, 2 is enclosed on all sides by housing parts 1, 2, 4 after the cover 2 is attached to the fixed part of the first housing part 1.

Inside the first housing part 1 is a second housing part 6 that is designed in the present example as a withdrawable module. The withdrawable module 6 is releasably connected by guides (not shown) to the first housing part 1. The withdrawable module 6 has a handle 7 to remove the withdrawable module 6 from the first housing part and correspondingly install the withdrawable module 6 in the housing part 1. In FIG. 1 we can see that the withdrawable module 6 is completely enclosed by the parts of the first housing part 1 after the cover 2 is put on.

According to one aspect of the invention, the withdrawable module has a HV side 8 and a LV side 9 that are spatially separated by a mounting plate 10. The LV side 9 faces the cover 2 and is accessbile from the outside after the cover is removed. In contrast, the HV side 8 is designed so that the HV supply part on the HV side 8 is fully within an area enclosed by the two housing parts 1, 4, 6 after the first housing part 1 and the second housing part 6 (withdrawable module) are joined. The HV supply part is therefore completely inaccessible from the outside after the withdrawable module 6 is installed. Of course, the entire housing is covered at the front (from the viewing direction) as well as from the rear (the rear of the housing in this illustration) by housing parts to provide a completely enclosed area for the HV part. In the present exemplary embodiment, this enclosed area is formed by the cited four side elements of the first housing part, and the two remaining sides are formed by the two side elements of the second housing part. However, there can be other combinations of side elements as long as they form an area enclosed on all sides after the two housing parts are joined.

The mounting plate 10 in particular carries a penetration (i.e., tube) 11 for necessary electrical connecting lines 12 between the LV side 9 and HV side 8. The penetration 11 in the shown exemplary embodiment hence also serves as a holder for printed circuit boards 13, 14 (cards) on the LV side 9 and HV side 8.

The card 13 on the LV side 9 only bears LV components 15. Other assemblies (not shown) may be on the LV side 9—a mains supply unit for example. These assemblies are easily accessible after the cover 2 is removed and can therefore be thoroughly serviced even when the power supply is on. The connecting lines 12 between the LV side 9 and HV side 8 are also at a LV potential and hence cannot be involved in the initially-cited high-voltage accidents.

The board 14 on the HV side 8 has another special feature according to the invention: it has LV components 16 including low-voltage supply parts for transforming a low voltage into a high voltage and HV components 17. Proceeding from the lines 18 running from the penetration 11, the electrical or electronic components 16, 17 on the HV board 14 are arranged corresponding to a voltage gradient of low-voltage to high-voltage leading from electrical penetration 11. The LV components 16 are close to the penetration 11, and the HV components 17 are located just outside of this area, whereby the voltage level applied to the individual components 16, 17 preferably increases steadily between the cited areas. The last-cited measure ensures in particular that no sparkover or leakage current can arise between individual components or modules 16, 17 within the entire LV-HV chain.

Since in the shown example the cable penetration 18 is essentially centrally located in reference to the board 14, the components 16, 17 in this example basically radiate outward from the penetration 11 corresponding to the voltage gradient. However, let it be noted that in addition to this radial arrangement, other geometric arrangements are possible that may be preferable depending on the external conditions of the respective housing type. For example, a linear component arrangement can be preferable where the LV components are on one side of the front of the board, and the HV components are on the other side.

The suggested arrangement according to the invention of the components 16, 17 on the HV board 14 also advantageously allows the dimensions of the board 14 to be reduced and accordingly the required area of the entire housing 1, 2.

Figure 2:
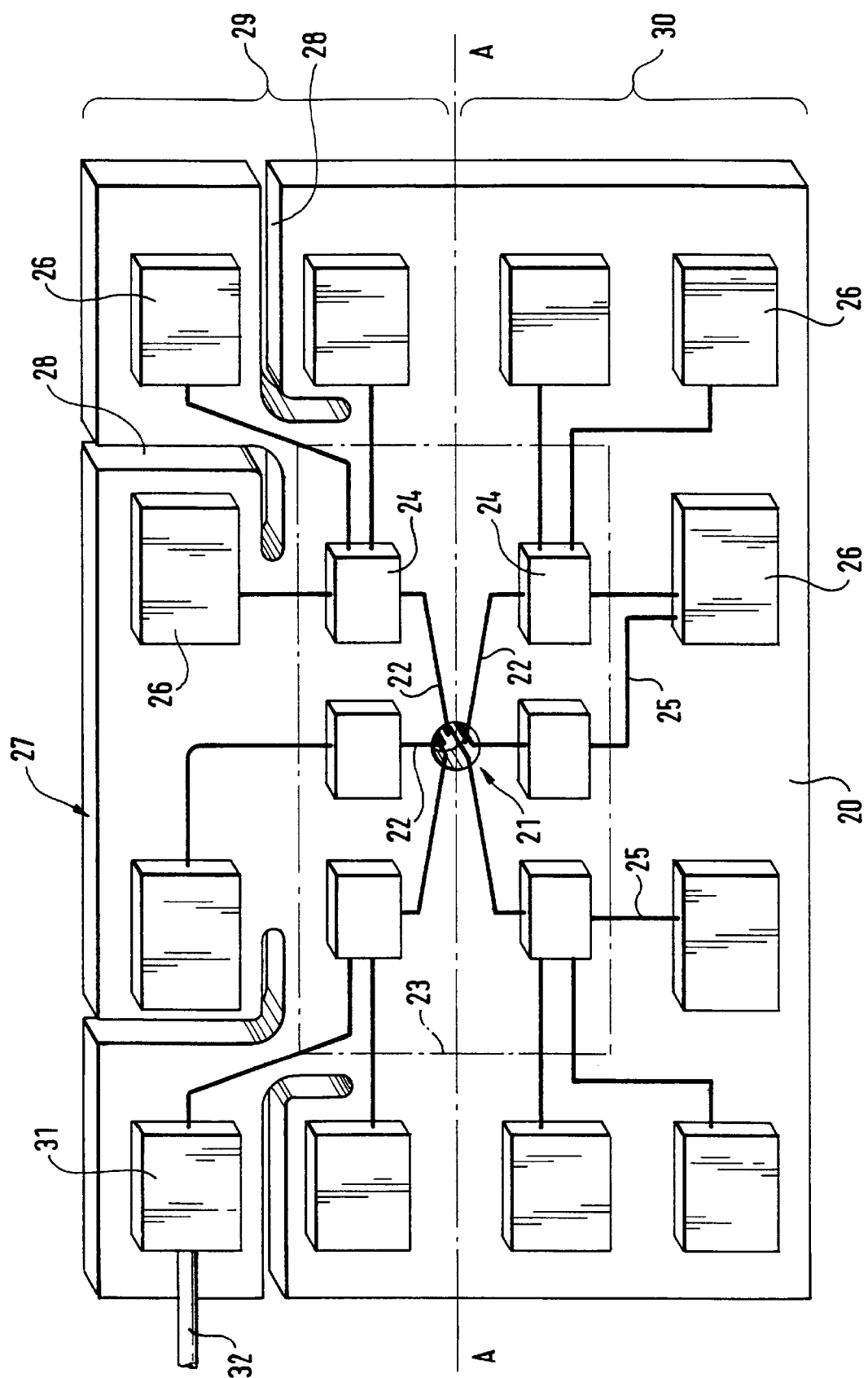
FIG. 2, a front view of a chassis according to the invention.

Shown in FIG. 2 is a front view of an exemplary embodiment of a HV main board 20 according to the invention where there is the previously-cited arrangement of the LV and HV components extending radially from the inside to the outside. To better orient the perspective of the viewer, the lengthwise axis 'A—A' of the device is drawn in. In this illustration, the HV modules have a grey background or are shaded to better differentiate between the low voltage (LV) and high-voltage (HV).

In the shown embodiment, there is a penetration (i.e., opening) 21 that passes approximately through the centre of board 20. Connecting lines 22 to the HV board 20 proceeding from the LV board (not shown) pass through opening 21. Proceeding from this penetration 21 are exclusively LV modules 24 first within an inner area having a perimeter 23 of the HV board 20. Connecting lines 25 leading outward across perimeter 23 connect the LV modules 24 to other modules 26 that are shown in a highly schematic manner in FIG. 2 and usually include numerous components. Hence the control loops required for precisely stabilizing the HV and all required components for generating the HV such as transformers or rectifier electronics are in modules 24 and 25.

The radial arrangement of the LV and HV components shown in this exemplary embodiment corresponding to the voltage gradient of LV to HV also has the advantage that the generally relatively compact LV components (in comparison to the HV components) can be densely arranged in the middle of the HV board. In contrast, the HV components are generally larger and hence must be spaced farther apart in this radial arrangement due to the special HV safety requirements. The radial arrangement meets this requirement in that the available area increases approximately by the square of the distance from the central penetration 24.

In another special feature according to the invention, the edge 27 of the HV board 20 in the shown embodiment has air gaps 28 between the individual HV modules 26. To simplify the illustration, the air gaps 28 are only drawn in the top area 29 of the shown board 20 as a example between just a few of the HV components, and are therefore to be correspondingly provided in the other areas, especially the bottom area 30 of the board 20. The function of these air gaps 28 is to minimize the required isolation distances between HV components or modules 26 without however excessively increasing the risk of sparkover, especially of leakage current, between these modules 26.

The overall upwardly transformed voltage finally reaches module 31 and can be guided through a screened, i.e., shielded, cable 32 from the HV board 20 outward in a familiar manner.

Figure 3:
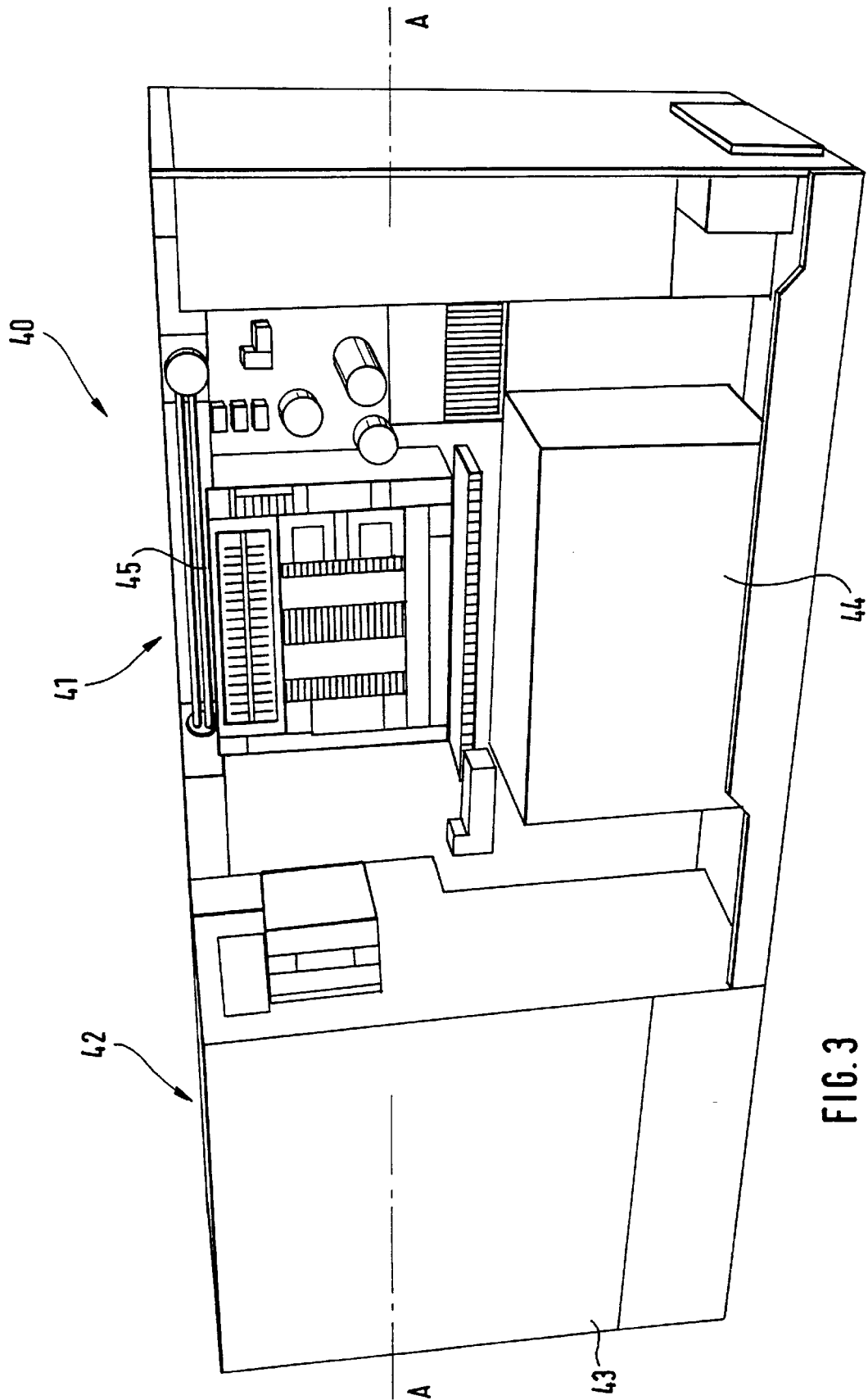
FIG. 3, a perspective, schematic overview of the entire housing arrangement according to the invention.

FIG. 3 is an illustration of a housing arrangement 40 according to the invention with the, above-discussed HV supply device being located in cabinet 45 in the rear part 41 of the housing arrangement 40. The device axis 'A—A' is drawn in as in the above-described figures. The front part 42 of the housing arrangement 40 contains other components of a measuring apparatus 43 not shown in detail. The measuring apparatus 43 can be a spectrometer, a chromatographic measuring device, or a microfluid measuring system.

There is a voltage supply device according to the invention in the rear part 41 of the housing 40. In the bottom part, the supply device has a mains supply unit 44 that provides all of the required low voltage for the device form the connected system voltage. In the top part 41 of the housing 40, there is an electrical module that serves as a control entity for the device and the control electronics. This module also provides the electrical connecting lines to the HV module 45 required for control.

To permit shockproof servicing on the LV side even when the first housing part is open (especially the cover), all mains voltage components that are dangerous to contact are screened from the outside by a housing part 44. This allows service work to be carried out safely even when the system voltage is live.

Another advantage of the housing arrangement is that the HV supply device 45 can be exchanged relatively easily and quickly with a new unit (withdrawable module, see FIG. 1) when there is a functional defect or operational failure. The replacement can be made without shutting down the entire measuring apparatus 43 for a long period. Based on the suggested arrangement of the housing 40, only failures or required adjustments on the LV side can be dealt with while the HV is live.

Given the described functionalities and properties, the voltage supply device according to the invention can be advantageously used in a laboratory environment in which electrical sparkover between the HV components can occur more easily, e.g. in the relatively moist environment of a chemistry or biology laboratory.

What is claimed is:

1. A high voltage supply comprising a housing having an interior wall separating the housing into first and second segments, the first segment including only low voltage components, the second segment including at least one low voltage component and high voltage components, the low voltage component of the second segment including a low-voltage supply part for transforming a low voltage into a high voltage, the wall including a first portion for enabling coupling of power from at least one low voltage component of the first segment to said at least one low voltage component of the second segment, the second segment including circuitry for coupling power from said low voltage supply part of the second segment to the high voltage components.

2. The apparatus of claim 1 wherein all of the low voltage components of the second segment are located closer to the first portion of the wall than any of the high voltage components.

3. The apparatus of claim 2 wherein all of the low voltage components of the second segment are located on a first portion of a circuit board surrounding and in proximity to the first portion of the wall, all of the high voltage components being located on a second portion of the circuit board surrounding the first portion of the wall.

4. The apparatus of claim 3 wherein the circuit board includes adjacent pairs of modules including the high voltage components, the board also including slots separating the modules, the slots being arranged for reducing at least one of high voltage breakdown and leakage current between the adjacent module pairs.

5. The apparatus of claim 3 wherein the first portion of the wall is centrally located on the wall.

6. The apparatus of claim 1 wherein the wall, the second segment, the components in the second segment and the housing are arranged so that the wall and components in the second segment are a unitary structure that is slidably received in the remainder of the housing and is slidably removable from the remainder of the housing; the wall, the housing and the second segment being arranged so that the components in the second segment are enclosed by walls of the second segment when the second segment is in place in the housing.

7. The apparatus of claim 6 wherein the housing includes a removable cover for providing access to personnel to the first segment while the remainder of the housing and the wall cause the components in the second segment to remain inaccessible to personnel.

8. The apparatus of claim 7 wherein the low and high voltage components of the second segment are located on a first circuit board carried by the wall, the components of the first segment being located on a second circuit board carried by the wall.

9. The apparatus of claim 1 wherein the housing includes a removable cover for providing access to personnel to the first segment while the remainder of the housing and the wall cause the components in the second segment to remain inaccessible to personnel.

10. The apparatus of claim 9 wherein the second segment includes a structure for facilitating removal of the second segment from the remainder of the housing; the wall, the second segment, the components in the second segment, the structure for facilitating and the housing are arranged so that the wall and components in the second segment are a unitary structure that is slidably received in the remainder of the housing and is slidably removable from the remainder of the housing; the wall, the housing and the second segment being arranged so that the components in the second segment are enclosed by walls of the second segment when the second segment is in place in the housing.

11. The apparatus of claim 1 wherein the wall portion includes an opening between the first and second segments, at least one wire extending through the opening for providing structure for coupling the power from the first segment to the second segment.

12. The apparatus of claim 1 wherein a component in the first segment is arranged to be connected to a mains supply.

13. A high voltage supply comprising a housing having an interior wall separating the housing into first and second segments, the first segment including only low voltage components, the second segment including at least one low voltage component and high voltage components; the second segment including a structure for facilitating removal of the second segment from the remainder of the housing; the wall, the second segment, the components in the second segment, the housing and the structure for facilitating being arranged so that the wall and components in the second segment are a unitary structure that is slidably received in the remainder of the housing and is slidably removable from the remainder of the housing; the wall, the housing and the second segment being arranged so that the components in the second segment are enclosed by walls of the second segment when the second segment is in place in the housing; the housing including a removable cover for providing access to personnel to the first segment while the remainder of the housing and the wall cause the components in the second segment to remain inaccessible to personnel.

14. The apparatus of claim 13 wherein the low and high voltage components of the second segment are located on a first circuit board carried by the wall, the components of the first segment being located on a second circuit board carried by the wall.

15. The apparatus of claim 13 wherein a component in the first segment is arranged to be connected to a mains supply.

16. The apparatus of claim 13 wherein the wall includes a portion for coupling power from the first segment to the second segment.

17. The apparatus of claim 16 wherein all of the low voltage components of the second segment are located closer to the portion than any of the high voltage components.

18. The apparatus of claim 13 wherein the wall, the second segment, the components in the second segment, the housing and the structure for facilitating being arranged so that the wall and components in the second segment are slidably received in ther housing and slidably removable from the remainder of the housing.

19. The apparatus of claim 18 wherein the structure for facilitating comprises a handle.

20. The apparatus of claim 13 wherein the structure for facilitating comprises a handle.

* * * * *